United States Patent [19]

Yamaguchi et al.

[11] Patent Number: 5,526,173
[45] Date of Patent: Jun. 11, 1996

[54] METHOD OF LOCAL DOMAIN CONTROL ON NONLINEAR OPTICAL MATERIALS

[75] Inventors: Takashi Yamaguchi, Chiba; Masahiro Yamada, Kanagawa, both of Japan

[73] Assignee: Sony Corporation, Tokyo, Japan

[21] Appl. No.: 302,053

[22] Filed: Sep. 7, 1994

[30] Foreign Application Priority Data

Sep. 10, 1993 [JP] Japan .................................. 5-226089

[51] Int. Cl.$^6$ ...................................... G02F 1/37
[52] U.S. Cl. ............................ 359/328; 385/122
[58] Field of Search ..................... 385/122; 359/326–332

[56] References Cited

U.S. PATENT DOCUMENTS 5,039,186  8/1991  Man et al. .......................... 385/122
5,061,028  10/1991 Khanarian et al. ................. 359/332 X

FOREIGN PATENT DOCUMENTS

3-48831   5/1991  Japan .
3-121428  8/1991  Japan .
4-19719   4/1992  Japan .

*Primary Examiner*—John D. Lee
*Attorney, Agent, or Firm*—Hill, Steadman & Simpson

[57] ABSTRACT

A plurality of first electrodes are disposed on one of opposite surfaces of a nonlinear optical material substrate which is divided into single domains. Each of the first electrodes is made of an electric conductor having a width which is equal to or smaller than half the width of a designed local inverted-polarization domain. A second electrode is positioned on the other of the opposite surfaces in confronting relation to the first electrodes. A voltage is applied between the first and second electrodes thereby to produce local inverted-polarization domains in the nonlinear optical material substrate.

6 Claims, 6 Drawing Sheets

METHOD OF LOCAL DOMAIN CONTROL ON NONLINEAR OPTICAL MATERIALS

BACKGROUND OF THE INVENTION

The present invention relates to a method of controlling local polarizations in a nonlinear optical material which is suitable for use in the formation of a periodically inverted-polarization structure in an optical second-harmonic generator (SHG).

Second-harmonic generators for converting a radiation having a fundamental frequency of ω into a radiation having a second-harmonic frequency of 2ω may be combined with a semiconductor laser, for example, to provide a short-wavelength radiation source for converting a near-infrared radiation into a blue radiation. The short-wavelength radiation source can increase a wavelength range available for the coherent radiation produced by the semiconductor laser, and is effective in giving semiconductor lasers a widened range of applications and optimizing laser applications in various fields of art. For example, a shortened laser wavelength allows optical or magnetooptical recording and reproducing devices which employ laser beams to increase the recording density and resolution.

The second-harmonic generators include a bulk-type second-harmonic generator made of KTP, a second-harmonic generator in the form of an optical waveguide employing a greater nonlinear optical constant, and a second-harmonic generator of the Cerenkov radiation type comprising an optical waveguide disposed on a single-crystal substrate made of a nonlinear optical material such as lithium niobate (LiNbO$_3$), so-called "LN", for guiding near-infrared radiation to produce blue radiation as a second harmonic in a radiation mode from the single-crystal substrate.

The bulk-type second-harmonic generator has a relatively low SHG conversion efficiency because of its characteristics. The second-harmonic generator of the Cerenkov radiation type has practical problems because the second-harmonic beam is radiated in a direction within the substrate and the beam spot is of a special shape such as a crescent shape.

For high conversion SHG efficiency, it is necessary to confine and guide a fundamental and a second harmonic within the same waveguide and also to equalize the phase propagation velocities of the fundamental and the second harmonic.

One known process of equalizing the phase propagation velocities is a quasi-phase matching process which provides a periodically inverted-polarization structure having polarizations periodically inverted in the direction in which radiations are guided in an optical second-harmonic generator.

Such a periodically inverted-polarization structure may be realized by either cutting a crystal of single polarization into thin slices and joining the slices with their crystallographic axes being alternately inverted to periodically inverting the polarizations thereof, or controlling the polarity of a current which is supplied when a crystal is grown for thereby producing periodic polarizations or domains. The former process is disadvantageous in that it is difficult to achieve an optical coupling when the thin crystal slices are joined. The latter process is problematic because it requires a large-scale manufacturing apparatus and it is difficult to control the formation of inverted polarizations.

There has been proposed in Japanese laid-open patent publication No. 4-335620 a process of forming a periodically inverted-polarization structure by positioning first and second electrodes on a ferroelectric material which is divided into single domains, the first and second electrodes being arranged in the direction of polarization in a pattern corresponding to the pattern of an inverted-polarization structure with at least the first electrodes being finally obtained. In the disclosed process, a voltage ranging from 1 kV/mm to 100 kV/mm is applied between the first and second electrodes such that the negative side of spontaneous polarization of the ferroelectric material is maintained at a negative potential and the positive side at a positive potential.

Figure 1:
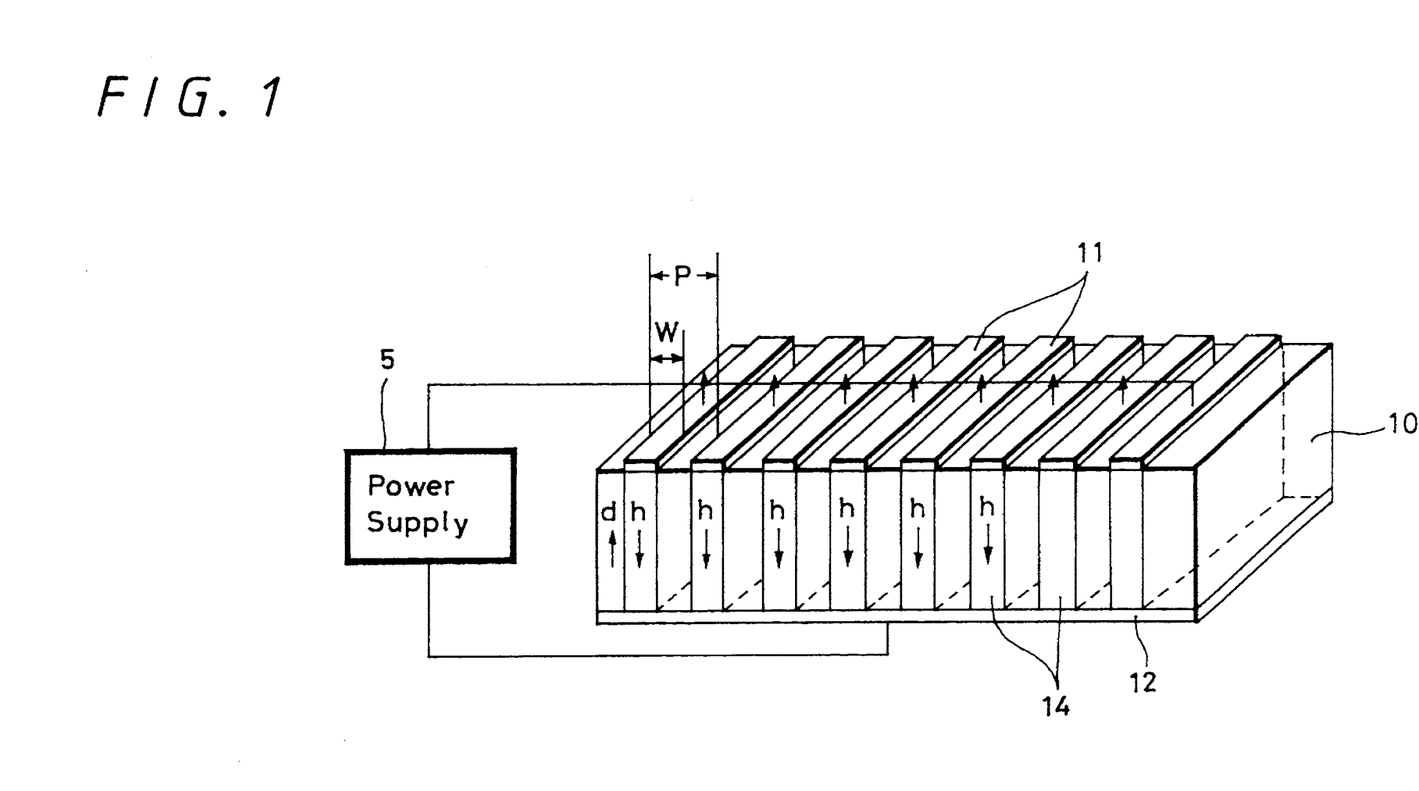
FIG. 1 is a perspective view illustrative of the step of inverting polarizations in a conventional process of controlling the inversion of polarizations.

One example of such a process of controlling the inversion of polarizations will be described with reference to FIG. 1 of the accompanying drawings. In FIG. 1, the direction of spontaneous polarization in a nonlinear optical material is indicated by the arrow "d", and the direction of polarizations in local inverted-polarization domains is indicated by the arrow "h".

A nonlinear optical material substrate 10 comprises a single crystal of LN having a thickness of about 0.1 mm which is divided into similar single domains in the direction of the c axis thereof. On the +c surface of the substrate 10, there are disposed a plurality of first electrodes 11 as parallel strips each having a width W of 1.3 μm at a pitch P of 2.6 μm, for example, in the same pattern as a pattern of desired local inverted-polarization domains each having a width of 1.3 μm at a pitch P of 2.6 μm, for example. A second electrode 12 is disposed on the entire −c surface of the substrate 10 which lies opposite to the +c surface. A power supply 5 for applying a voltage is connected between the first electrodes 11 and the second electrode 12.

At room temperature, a voltage of 26 kV/mm, for example, is applied by the power supply 5 between the first and second electrodes 11, 12 such that the first electrodes 11 on the positive side of spontaneous polarization of the nonlinear optical material 10 is maintained at a positive potential and the second electrode 12 on the negative side at a negative potential, thereby forming local inverted-polarization domains 14. The local inverted-polarization domains 14 are thus produced in the form of parallel strips at the pitch P, and the resultant overall structure becomes a periodically inverted-polarization structure for use as a second-harmonic generator.

If the width Wi of each of the local inverted-polarization domains 14 is ½ of the pitch P, then theoretically, the second-harmonic generator produces a greatest second-harmonic output and hence has a high SHG conversion efficiency.

Figure 2:
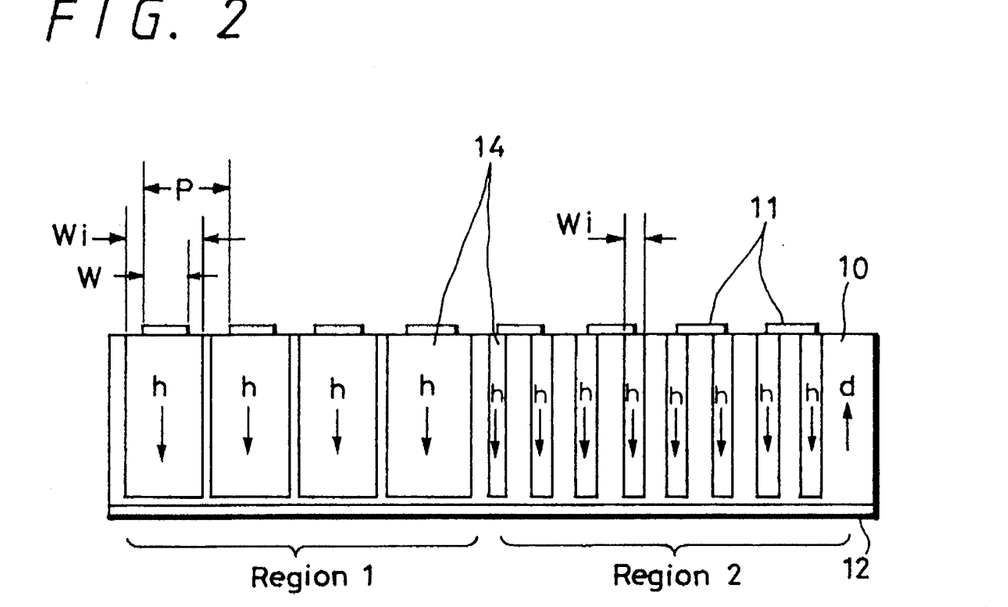
FIG. 2 is a cross-sectional view of a periodically inverted-polarization structure produced by the conventional process shown in FIG. 1.

FIG. 2 of the accompanying drawings illustrates in cross section a periodically inverted-polarization structure produced by the conventional process shown in FIG. 1, FIG. 2 being based on a microscopic photograph thereof. As shown in FIG. 2, in a region 1 of the periodically inverted-polarization structure, the width Wi of each of the local inverted-polarization domains 14 is greater than the width W of each of the electrodes 11. In a region 2, however, polarizations are inverted below only the edges of the electrodes 11, and local inverted-polarization domains are not formed uniformly below the electrodes 11. The periodically inverted-polarization structure composed of the local inverted-polarization domains 14 as shown in FIG. 2 is different from the periodically inverted-polarization structure which theoretically provides a high SHG conversion efficiency, and produces a lower second-harmonic output.

SUMMARY OF THE INVENTION

It is therefore an object of the present invention to provide a method of controlling local polarizations to produce local inverted-polarization domains with good controllability, without forming irregular or ununiform local inverted-polarization domains.

According to the present invention, there is provided a method of controlling local polarizations in a nonlinear optical material, comprising the steps of positioning a plurality of first electrodes on one of opposite surfaces of a nonlinear optical material substrate divided into single domains, each of said first electrodes being made of an electric conductor having a width which is equal to or smaller than half the width of a designed local inverted-polarization domain, positioning a second electrode on the other of said opposite surfaces in confronting relation to said first electrodes, and applying a voltage between said first and second electrodes thereby to produce local inverted-polarization domains in the nonlinear optical material substrate.

The method may further comprises the step of positioning a third electrode which short-circuits said first electrodes and has a width greater than the width of each of the first electrodes, on said one of the opposite surfaces before the voltage is applied between said first and second electrodes.

The nonlinear optical material substrate may be made of $LiNb_xTa_{1-x}O_3$ ($0 \leq x \leq 1$).

DETAILED DESCRIPTION OF THE PREFERRED EMBODIMENTS

Figure 3:
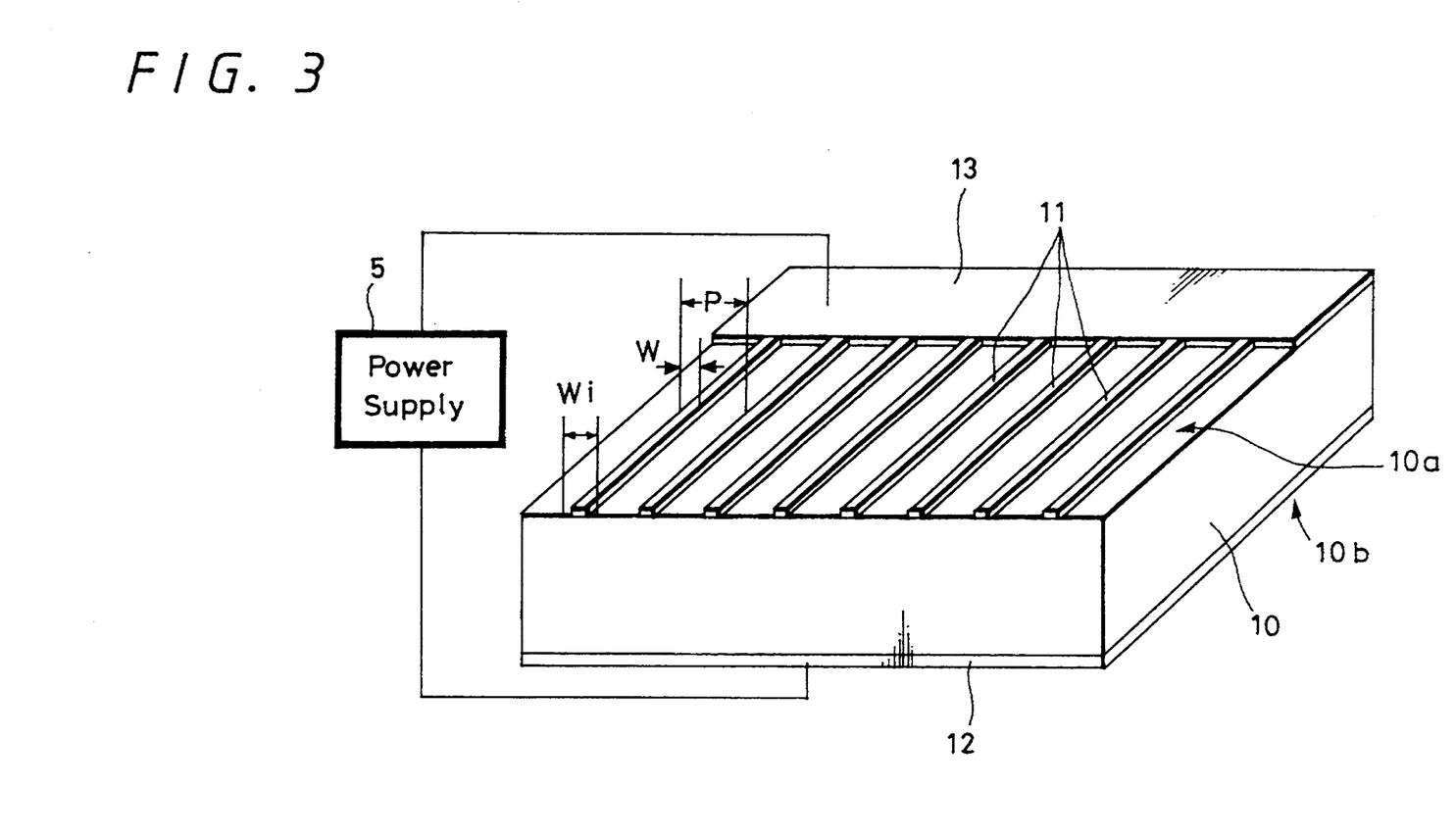
FIG. 3 is a perspective view illustrative of the step of inverting polarizations in a method of controlling the inversion of polarizations of a nonlinear optical material according to the present invention.

FIG. 3 illustrates a method of controlling the inversion of polarizations of a nonlinear optical material according to an embodiment of the present invention. In the method shown in FIG. 3, a nonlinear optical material substrate 10 which is divided into single domains has opposite surfaces 10a, 10b. A plurality of parallel first electrodes 11 are disposed on the surface 10a, each of the first electrodes 11 having a width equal to or less than half the width Wi of a designed local inverted-polarization domain. A second electrode 12 is disposed on the other surface 10b in confronting relation to the first electrodes 11.

A voltage is applied by a power supply 5 between the first electrodes 11 and the second electrode 12 to produce local inverted-polarization domains 14 in the nonlinear optical material substrate 10.

The method according to the embodiment of the present invention is capable of forming the desired shapes of local inverted-polarization domains 14 with good controllability. The reasons for this will be described below.

Generally, when a voltage is applied to a substrate such as of a single crystal of LN through electrodes, inverted electric fields generated in the substrate are different in areas below the centers of the electrodes, areas below the edges of the electrodes, and an area free of the electrodes.

Figure 4:
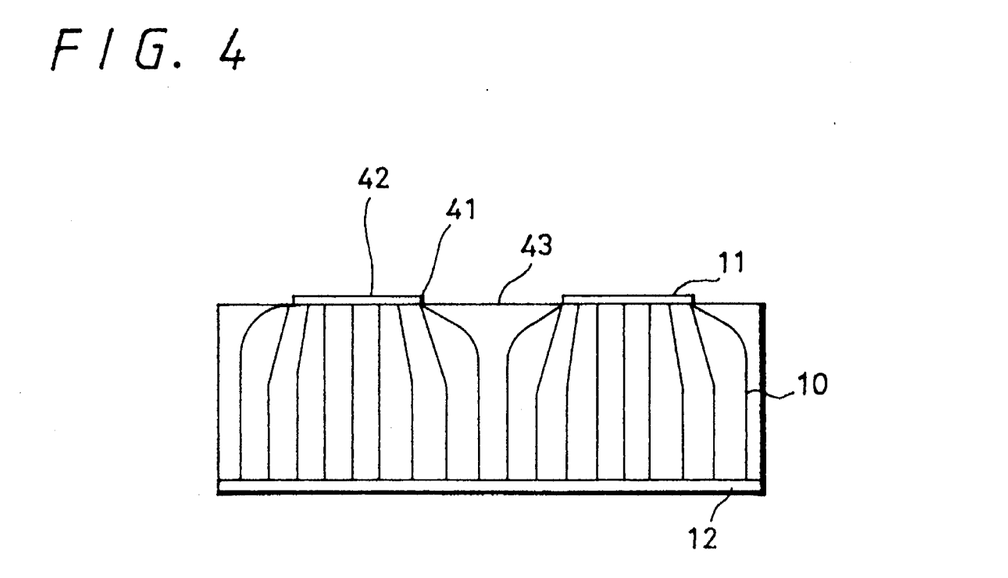
FIG. 4 is a schematic diagram showing a distribution of electric fields.

Inverted electric fields generated in the substrate will be described below with reference to FIG. 4. In FIG. 4, first electrodes 11 are disposed on a surface of a nonlinear optical material substrate 10, and a second electrode 12 is disposed on a reverse surface thereof. A voltage is applied between the first and second electrodes 11, 12.

The intensities of electric fields produced in the nonlinear optical material substrate 10 are indicated by the density of lines of electric force. The magnitudes of the intensities of electric fields in areas below electrode edges 41, areas below electrode centers 42, and an area below a region 43 free of the electrodes which is positioned between the first electrodes 11 will be described below.

Since electric charges on the first electrodes 11 tend to concentrate on the electrode edges 41, the density of lines of electric force is largest in the areas below the electrode edges 41. The density of electric lines of force in the areas below the electrode centers 42 is second largest, and smallest in the area below the electrode-free region 43.

Local inverted-polarization domains are generated and grown in sizes and at speeds which are larger as the electric field intensity is greater. Therefore, local inverted-polarization domains are generated, grown, and spread in a largest size in the areas below the electrode edges 41 where the electric field intensity is greatest. Local inverted-polarization domains which are spread in a second largest size are positioned in the areas below the electrode centers 42, and local inverted-polarization domains which are spread in a smallest largest size are positioned in the area below the region 43 free of the electrode centers, i.e., between the first electrodes 11.

When local inverted-polarization domains are produced in the nonlinear optical material substrate 11 by the voltage applied between the first electrodes 11 and the second electrode 12, the ratio of the length of the first electrode edges to the area of the first electrodes is large, and the generation and growth of local inverted-polarization domains which are produced in the areas below the first electrode edges is dominant in the generation and growth of local inverted-polarization domains produced below the first electrodes.

Consequently, the difference between the size and speeds of generation and growth of local inverted-polarization domains in the areas below the first electrodes 11 and the area below the region 43 between the first electrodes 11 is large, preventing irregular local inverted-polarization domains from being formed. As a result, it is possible to produce a periodically inverted-polarization structure with good controllability.

As shown in FIG. 3, a third electrode 13 which short-circuits and is wider than the first electrodes 11 is disposed on the surface 10a of the nonlinear optical material substrate 10 on which the first electrodes 11 are disposed, at least before the voltage is applied between the first electrodes 11 and the second electrode 12. Even when a voltage is applied in excess of a voltage that is required to produce a periodically inverted-polarization structure below the first electrodes 11, the third electrode 13 is effective at preventing areas below the regions between the first electrodes 11 from generating inverted polarizations.

Specifically, when a voltage is further applied after a periodically inverted-polarization structure is produced below the first electrodes 11, an inverted-polarization domain tends to be spread more below the third electrode 13 than below the regions between the first electrodes 11. Therefore, the polarization below the third electrode 13 is first inverted. Upon further application of the voltage, the polarizations in the areas below the regions between the first electrodes 11 would be inverted. The voltage is applied under such conditions that local inverted-polarization domains start and stop spreading below the third electrode 13, thus allowing a periodically inverted-polarization structure to be produced reliably. Since the range of voltage applying conditions is widened, the periodically inverted-polarization structure is produced more stably.

Examples of the method according to the present invention will be described below.

In each of the examples, the nonlinear optical material substrate 10 was made of a single crystal of KTP ($KTiOPO_4$), LN, $LiTaO_3$, or the like, e.g., LN, and a periodically inverted-polarization structure was produced in the single crystal of LN and then an optical waveguide was formed, thereby providing a highly efficient second-harmonic generator. In each example, the nonlinear optical material substrate 10, i.e., the ferroelectric material substrate 10, was divided into single domains by heating the nonlinear optical material substrate 10 to a temperature immediately below the Curie temperature thereof, e.g., about 1200° C. and applying an external DC voltage fully to the nonlinear optical material substrate 10 in a certain direction to align all the c-axis directions. In each example, the voltage was applied at a temperature of 150° C. or below, e.g., room temperature.

Generally, the nonlinear optical material substrate 10 may be made of $LiNb_xTa_{1-x}O_3$ ($0 \leq x \leq 1$).

According to the present invention, the first electrodes 11 each made of an electric conductor and having a width W equal to or smaller than half of the width Wi of a designed local inverted-polarization domain, actually, in the range of from 1/10 to 1/2 of the width Wi, are disposed on the surface 10a of the nonlinear optical material substrate 10 divided into single domains. The second electrode 12 is disposed on the other surface 10b in confronting relation to the first electrodes 11.

Then, a voltage is applied between the first electrodes 11 and the second electrode 12 to produce local inverted-polarization domains in the nonlinear optical material substrate 10.

Preferably, the third electrode 13 which short-circuits and is wider than the first electrodes 11 is disposed on the surface 10a of the nonlinear optical material substrate 10 on which the first electrodes 11 are disposed, at least before the voltage is applied between the first electrodes 11 and the second electrode 12.

Example 1

The nonlinear optical material substrate 10 was made of a single crystal of LN having a thickness of about 0.1 mm. The nonlinear optical material substrate 10 was divided into single domains in the direction indicated by the arrow "d", i.e., in the c-axis direction. The plurality of parallel first electrodes 11 were disposed on the surface 10a, i.e., the +c surface, of the nonlinear optical material substrate 10. The width W of each of the first electrodes 11 was one-third of the width Wi of a desired local inverted-polarization domain to be produced, i.e., one-sixth of the period P of the first electrodes 11. In this example, Wi=1.5 μm, P=3.0 μm, and W=0.5 μm.

The second electrode 12 was disposed on the entire surface 10b, i.e., the −c surface, of the nonlinear optical material substrate 10.

Figure 5:
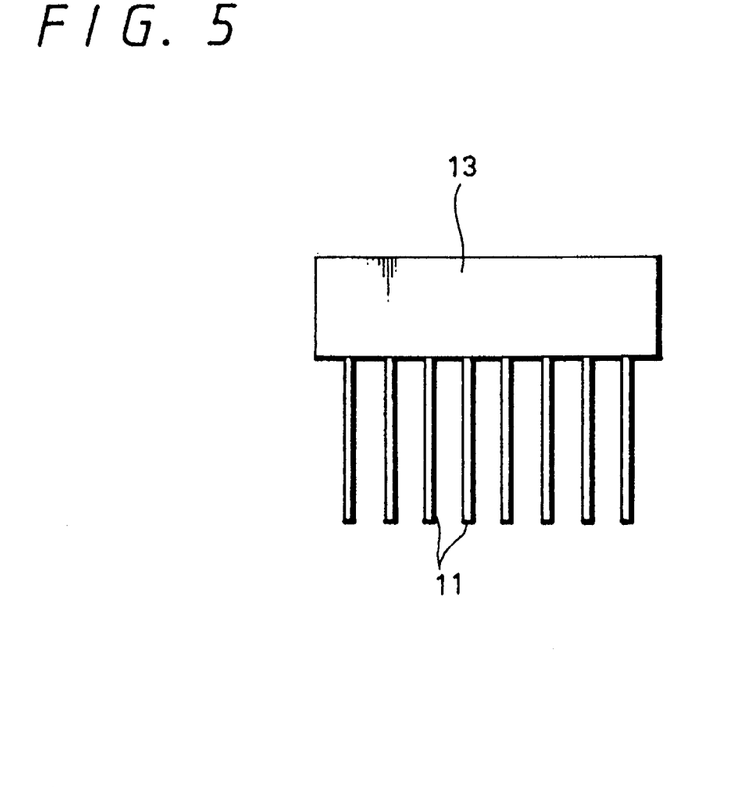
FIG. 5 is a plan view of a third electrode used in the method of controlling the inversion of polarizations of a nonlinear optical material according to the present invention.

As shown in FIG. 5, the common third electrode 13 short-circuiting ends of the first electrodes 11 was disposed on the surface 10a of the nonlinear optical material substrate 10 on which the first electrodes 11 are disposed.

The first and third electrodes 11, 13 were simultaneously and integrally formed by sputtering a metallic electrode layer to a thickness of 0.2 μm on the surface 10a of the substrate 10, and thereafter patterning the metallic electrode layer by photolithography.

The second electrode 12 was formed by sputtering a metallic electrode layer to a thickness of 0.2 μm on the surface 10b of the substrate 10.

The metallic electrode layers of the first, second, and third electrodes 11, 12, 13 were made of either aluminum (Al) or Al containing titanium (Ti) or silicon (Si) for the purpose of reducing the grain. In this example, the metallic electrode layers were made of Al containing Ti.

Then, at room temperature, a voltage of 26 kV/mm was applied from the power supply 5 to the first, second, and third electrodes 11, 12, 13 such that the first and third electrodes 11, 13 on the positive side of spontaneous polarization of the nonlinear optical material 10 is maintained at a positive potential and the second electrode 12 on the negative side at a negative potential.

Figure 6:
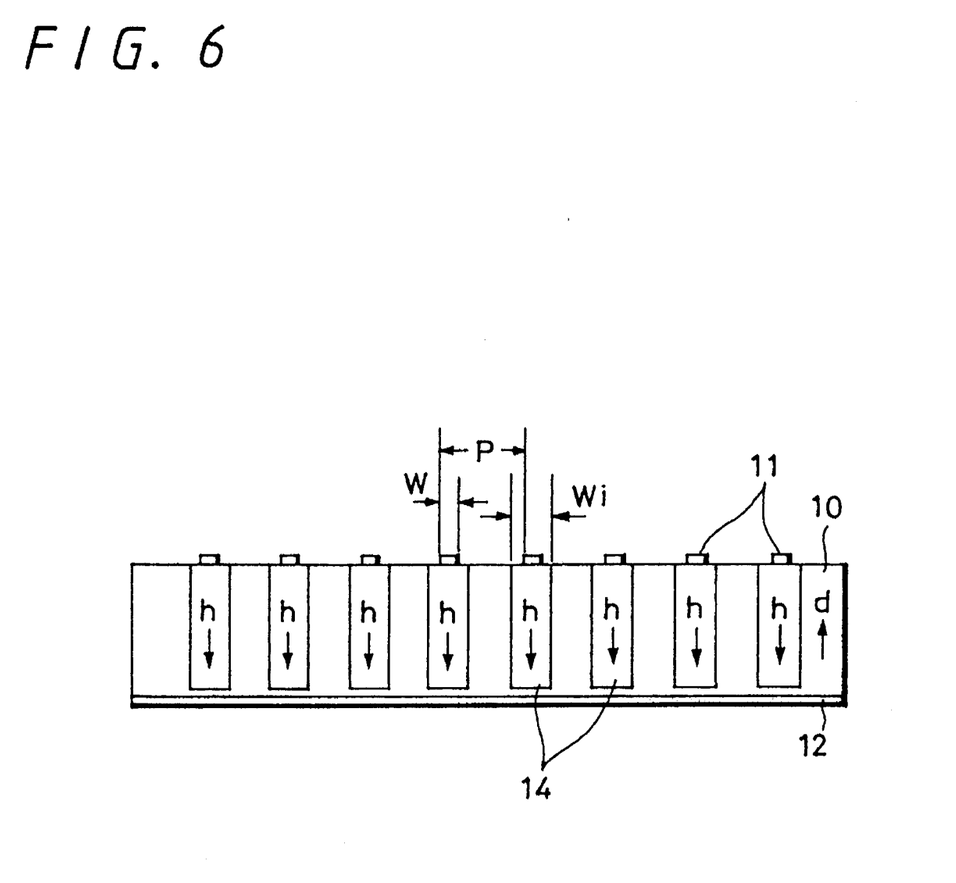
FIG. 6 is a cross-sectional view of a periodically inverted-polarization structure produced by the method according to the present invention.

In Example 1, there was produced a periodically inverted-polarization structure whose pitch P is substantially equal to twice the width Wi of each of local inverted-polarization domains. FIG. 6 shows in cross section the periodically inverted-polarization structure produced in Example 1, FIG. 6 being based on a microscopic photograph thereof. As shown in FIG. 6, the periodically inverted-polarization structure 14 was composed of stable local inverted-polarization domains 14 substantially equal to designed local inverted-polarization domains 14.

Figure 7:
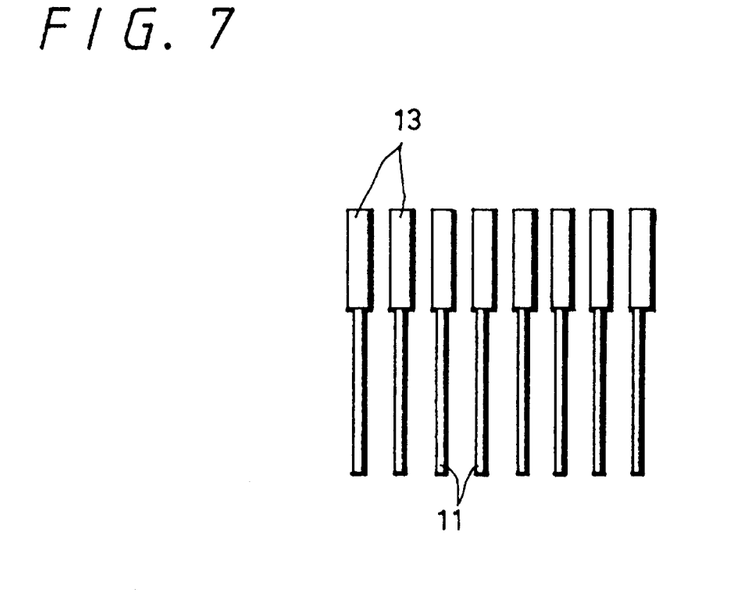
FIG. 7 is a plan view of other third electrodes which may be used in the method of controlling the inversion of polarizations of a nonlinear optical material according to the present invention.

In Example 1, the common third electrode 13 was shared by all the first electrodes 11 short-circuited by the third electrode as shown in FIGS. 3 and 5. However, as shown in FIG. 7, a plurality of third electrodes 13, wider than the first electrodes 11, may be connected to the first electrodes 11, respectively.

Example 2

Figure 8:
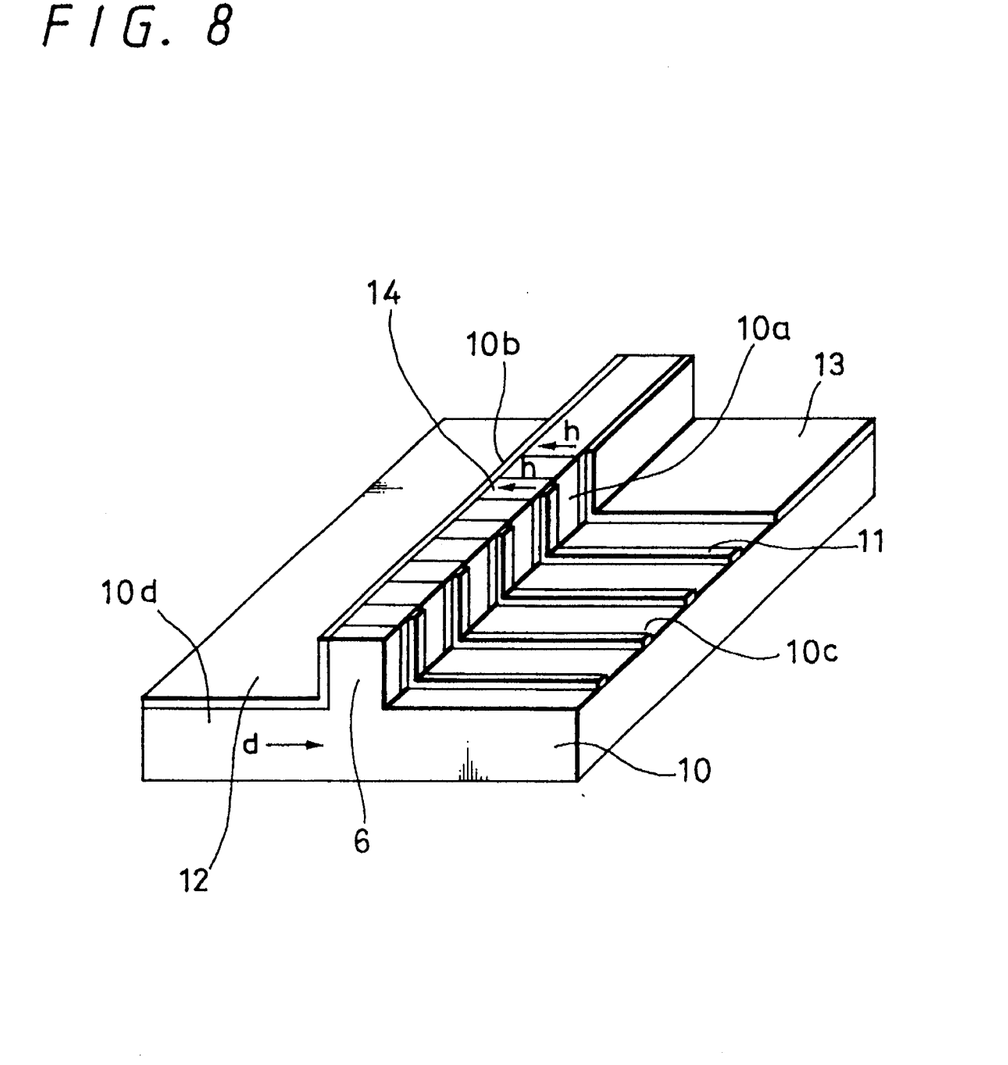
FIG. 8 is a perspective view illustrative of the step of inverting polarizations in a method of controlling the inversion of polarizations of a nonlinear optical material according to another embodiment of the present invention.

FIG. 8 illustrates a method of controlling the inversion of polarizations of a nonlinear optical material according to another embodiment of the present invention. Those parts shown in FIG. 8 which are identical to those shown in FIG. 3 are denoted by identical reference numerals, and will not be described in detail below.

In FIG. 8, a nonlinear optical material substrate 10 had a ridge 6 disposed on a surface thereof. The ridge 6 had a longitudinal direction selected to extend perpendicularly to the direction, indicated by the arrow "d", of spontaneous polarization of the nonlinear optical material substrate 10. The ridge 6 included a pair of opposite longitudinal side wall surfaces 10a, 10b, the side wall surface 10a being on the positive side of spontaneous polarization and the side wall surface 10b being on the negative side of spontaneous polarization.

A plurality of first electrodes 11 each having a width W are disposed at a pitch P on an upper surface 10c and a side wall surface 10a of the nonlinear optical material substrate 10. A second electrode 12 is disposed on an upper surface 10d and a side wall surface 10b of the nonlinear optical material substrate 10. A third electrode 13 is also disposed on the upper surface 10c and a side wall surface 10a of the nonlinear optical material substrate 10.

At room temperature, a voltage of 26 kV/mm was applied to the first, second, and third electrodes 11, 12, 13 such that the first and third electrodes 11, 13 on the positive side of spontaneous polarization of the nonlinear optical material 10 is maintained at a positive potential and the second electrode 12 on the negative side at a negative potential.

In Example 2, there was produced a periodically inverted-polarization structure 14 whose pitch P is substantially equal to twice the width Wi of each of local inverted-polarization domains.

According to the present invention, as described above, if the width W of each of the first electrodes 11 is in the range of from 1/10 to 1/2 of the width Wi of a desired local inverted-polarization domain, then local polarization control can positively be effected on the nonlinear optical material.

In each of Examples 1 and 2, the local polarization control was carried out at room temperature, i.e., at a temperature of 25° C. or below. The local polarization control carried out at room temperature is of great industrial advantage as no special heating means is required. However, the local polarization control may be carried out at a temperature ranging from −100° C. to 150° C.

A second-harmonic generator may be fabricated by forming an optical waveguide by diffusion or any other known process in the nonlinear optical material substrate which has the periodically inverted-polarization structure produced according to the method of the present invention, the optical waveguide being formed in the direction which is parallel to the normal of the produced domain walls.

The method according to the present invention is thus capable of stably producing a periodically inverted-polarization structure.

A second-harmonic generator which incorporates the periodically inverted-polarization structure thus produced can generate a second-harmonic output which is much higher and stabler than the second-harmonic output generated by a conventional second-harmonic generator.

Inasmuch as the periodically inverted-polarization structure can be produced at room temperature, the method according to the present invention can be carried out by a relatively simple apparatus, thus resulting in a large industrial advantage.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A method of controlling local polarizations in a nonlinear optical material, comprising the steps of:

positioning a plurality of first electrodes on a first surface of a nonlinear optical material substrate divided into single polarization domains, each of said first electrodes comprising an electric conductor having a width which is less than half the width of a designed local inverted-polarization domain;

positioning a second electrode on a second surface of the nonlinear substrate, the second surface opposite the first surface such that the second electrode is in confronting relation to said first electrodes; and applying a voltage between said first and second electrodes to produce local inverted-polarization domains in the nonlinear optical material substrate.

2. The method of claim 1, further comprising the step of:

positioning a third electrode on the first surface adjacent the plurality of first electrodes, the third electrode having an edge which interconnects said plurality of first electrodes, the third electrode having a width greater than a width of each of the first electrodes, on said first surface, the third electrode interconnecting the first electrodes before a voltage is applied between said first and second electrodes.

3. The method of claim 1, wherein said nonlinear optical material substrate is made of $LiNb_xTa_{1-x}O_3$ ($0 \leq x \leq 1$).

4. The method of claim 1 wherein the plurality of first electrodes are comprised of an electrical conductor having a width which is less than one third the width of a designed local inverted-polarization domain.

5. A method of controlling local polarizations in a nonlinear optical material, comprising the steps of:

positioning a plurality of first electrodes on a surface of a nonlinear optical material substrate, each of said first electrodes comprising an electric conductor having a width which is less than one third the width of a designed local inverted-polarization domain;

positioning a second electrode on a second surface of the nonlinear substrate, the second surface opposite the first surface such that the second electrode is in confronting relation to said first electrodes;

positioning a third electrode on the first surface adjacent the plurality of first electrodes, the third electrode having an edge which interconnects said plurality of first electrodes, the third electrode having a width greater than a width of each of the first electrodes on said first surface, the third electrode interconnecting the first electrodes before a voltage is applied between the first and second electrodes; and applying a voltage between said first and second electrodes to produce local inverted-polarization domains in the nonlinear optical material substrate.

6. The method of claim 5, wherein said nonlinear optical material substrate is made of $LiNb_xTa_{1-x}O_3$ ($0 \leq x \leq 1$).

\* \* \* \* \*